United States Patent
Sharma et al.

(10) Patent No.: US 8,890,936 B2
(45) Date of Patent: Nov. 18, 2014

(54) UTILIZING DEPTH INFORMATION TO CREATE 3D TRIPWIRES IN VIDEO

(75) Inventors: Vinay Sharma, Dallas, TX (US); Goksel Dedeoglu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 431 days.

(21) Appl. No.: 13/271,738

(22) Filed: Oct. 12, 2011

(65) Prior Publication Data

US 2012/0086780 A1  Apr. 12, 2012

Related U.S. Application Data

(60) Provisional application No. 61/392,078, filed on Oct. 12, 2010.

(51) Int. Cl.
*H04N 13/02* (2006.01)
*G08B 13/02* (2006.01)
*G09G 5/00* (2006.01)
*G06K 9/62* (2006.01)
*H04N 13/00* (2006.01)
*G06K 9/00* (2006.01)
*G06T 7/20* (2006.01)

(52) U.S. Cl.
CPC ........ *G06K 9/00771* (2013.01); *H04N 13/0022* (2013.01); *G06T 2207/30232* (2013.01); *H04N 13/0296* (2013.01); *G06T 2207/30196* (2013.01); *G06T 2207/10028* (2013.01); *G06T 2200/24* (2013.01); *H04N 13/0239* (2013.01); *G06T 2207/30241* (2013.01); *G06T 7/20* (2013.01)
USPC .............. 348/46; 340/541; 345/156; 382/103

(58) Field of Classification Search
CPC ......... H04N 7/181; H04N 7/183; H04N 7/18; H04N 7/188; G08B 13/19656; G08B 13/19602; G08B 13/19697; G06K 9/00771; G06K 9/3241; G06T 2207/10016; G06T 7/2033; G06T 7/20
USPC ............. 348/46, 143, 152; 340/541; 345/156; 382/103

See application file for complete search history.

(56) References Cited

U.S. PATENT DOCUMENTS

| 6,696,945 B1 | 2/2004 | Venetianer et al. |
| 6,970,083 B2 | 11/2005 | Venetianer et al. |
| 2003/0020808 A1* | 1/2003 | Luke et al. .................... 348/47 |
| 2004/0105570 A1* | 6/2004 | Venetianer et al. .......... 382/100 |

OTHER PUBLICATIONS

J. Salas and C. Tomasi, "People Detection Using Color and Depth Images", Mexican Conference on Pattern Recognition, pp. 127-135, Jun. 2011.

(Continued)

*Primary Examiner* — Dave Czekaj
*Assistant Examiner* — Tsion B Owens
(74) *Attorney, Agent, or Firm* — Mima Abyad; W. James Brady; Frederick J. Telecky, Jr.

(57) ABSTRACT

A method of processing a digital video sequence is provided that includes detecting a foreground object in an image captured by a depth camera, determining three-dimensional (3D) coordinates of the foreground object, and comparing the 3D coordinates to a 3D video tripwire to determine if the foreground object has crossed the 3D video tripwire. A method of defining a 3D video tripwire is also provided.

10 Claims, 4 Drawing Sheets

(56) References Cited

OTHER PUBLICATIONS

M. Harville, et al, "Foreground Segmentation Using Adaptive Mixture Models in Color and Depth", Proceedings of IEEE Workshop on Detection and Recognition of Events in Video, pp. 3-11, Jul. 2001.

A. Lipton, et al, "Critical Asset Protection, Perimeter Monitoring, and Threat Detection Using Automated Video Surveillance", Proceedings of IEEE 36th Annual International Carnahan Conference on Security Technology, pp. 1-11, 2002.

C. Eveland, et al, "Background Modeling for Segmentation of Video-Rate Stereo Sequences", Proceedings of IEEE Computer Vision and Pattern Recognition, pp. 266-271, Jun. 1998.

* cited by examiner

UTILIZING DEPTH INFORMATION TO CREATE 3D TRIPWIRES IN VIDEO

CROSS-REFERENCE TO RELATED APPLICATIONS

This application claims benefit of U.S. Provisional Patent Application Ser. No. 61/392,078, filed Oct. 12, 2010, which is incorporated by reference herein in its entirety.

BACKGROUND OF THE INVENTION

1. Field of the Invention

Embodiments of the present invention generally relate to using depth information to create and monitor three-dimensional (3D) tripwires in video.

2. Description of the Related Art

One of the popular functions of camera-based (video analytics) automatic surveillance systems is to detect/alert when objects cross over a user-defined virtual line in the scene under surveillance. Typically, this "line" (commonly referred to as a video tripwire or video trip zone) is defined using a point-and-click graphical user interface which is overlaid on a two-dimensional (2D) video frame. The line may be specified explicitly by its two end-points, or as the adjacent edge of two polygons. An underlying video analytics algorithm then compares the 2D (x,y) coordinates of detected objects against the 2D line, and generates an alarm if an object crosses or intersects that line. Because these 2D coordinates are merely projections of a 3D (x,y,z) world onto the 2D image plane, there is inherent ambiguity in the desired alert behavior, resulting in potential false alarms.

SUMMARY

Embodiments of the present invention relate to methods and systems for creating and monitoring 3D video tripwires. In one aspect, a method of processing a digital video sequence includes detecting a foreground object in an image captured by a depth camera, determining three-dimensional (3D) coordinates of the foreground object, and comparing the 3D coordinates to a 3D video tripwire to determine if the foreground object has crossed the 3D video tripwire.

In another aspect, a method of defining a three-dimensional (3D) video tripwire in a video surveillance system includes displaying images of a scene on a display screen, wherein the images are from a depth camera positioned to monitor the scene, and defining the 3D video tripwire based on 3D coordinates of pixels corresponding to points selected in the scene by a user.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Figure 1A:
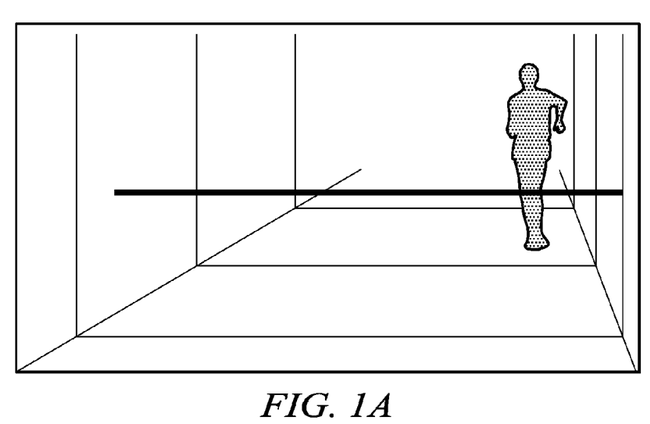
FIGS. 1A-1C are examples illustrating a video tripwire.
Figure 1B:
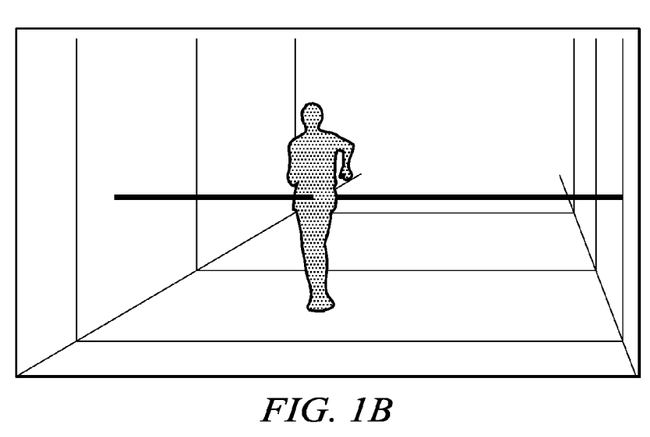
Figure 1C:
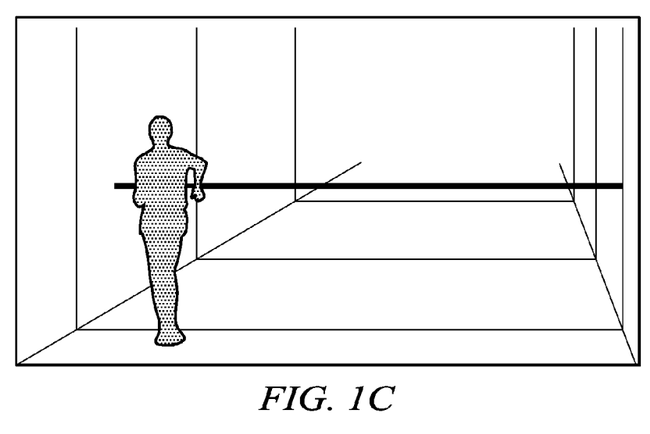

A common drawback of current techniques for defining and using video tripwires is that the lines are represented on a two-dimensional image, where there is no notion of depth. As was previously mentioned, there is inherent ambiguity in the desired alert behavior because the two-dimensional (2D) coordinates of a line are merely projections of a three-dimensional (3D) (x,y,z) world onto the 2D image plane, resulting in potential false alarms. FIGS. 1A-1C show an example scenario in which the 2D line will result in false alarms even when the person is clearly behind (FIG. 1A) or in front (FIG. 1C) of the user-defined line. The person is actually crossing the line only in FIG. 1B, but reliably distinguishing the three cases using only 2D data is difficult.

Embodiments of the invention utilize depth information of a scene monitored by a depth camera to create a 3D video tripwire. The representation of the 3D video tripwire may take the form of a 3D ray/line, a plane, etc. The three dimensions at each pixel in a depth image of a scene correspond to the x and y coordinates in the image plane, and a z coordinate that represents the depth (or distance) of that physical point from the camera. This depth information is readily available from 3D video sensors such as stereoscopic, structured light, and time-of-flight cameras.

Depth information is used to enable a user to specify the x, y, z coordinates of lines (or planes) of interest in a scene. Depth information is also used to track the x, y, z coordinates of objects in the scene and to signal a crossing event when the coordinates of an object are determined to have crossed the user defined line (or plane). Utilizing depth information in this manner may eliminate false alarms in scenarios such as those shown in FIGS. 1A and 1C.

Figure 2:
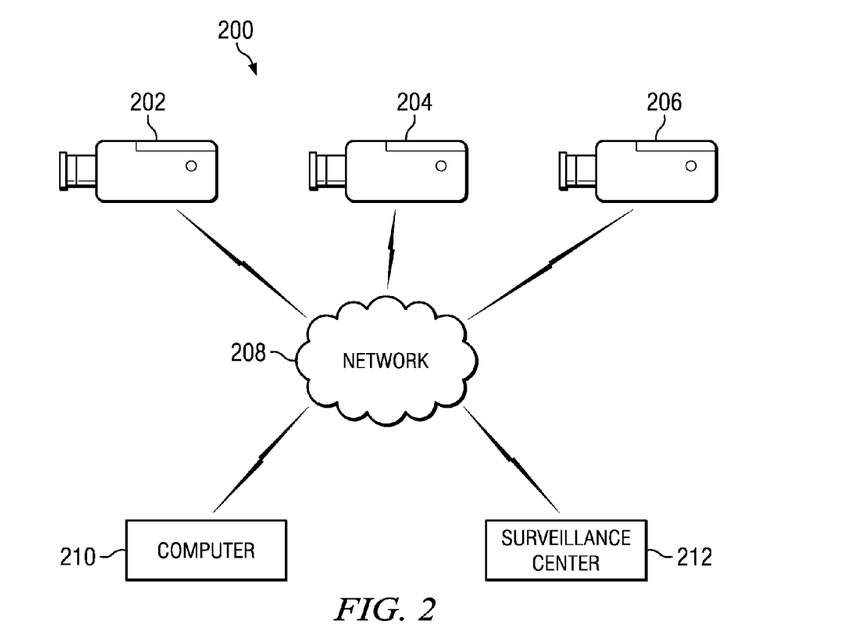
FIG. 2 is a block diagram of a surveillance system.

FIG. 2 is a block diagram of an example surveillance network 200. The surveillance network 200 includes three video surveillance cameras 202, 204, 206, and two monitoring systems 210, 212 connected via a network 208. The network 208 may be any communication medium, or combination of communication media suitable for transmission of video sequences captured by the surveillance cameras 202, 204, 206, such as, for example, wired or wireless communication media, a local area network, or a wide area network.

Three surveillance cameras are shown for illustrative purposes. More or fewer surveillance cameras may be used. Each of the surveillance cameras 202, 204, 208 includes functionality to capture depth images of a scene. A depth image, which may also be referred to as a 3D image, is a two-dimensional array where the x and y coordinates correspond to the rows and columns of the pixel array as in a 2D image, and the corresponding depth values (z values) of the pixels are stored in the array's elements. These depth values are distance measurements from the camera to the corresponding surface points on objects in the scene.

A camera with functionality to capture depth images of a scene may be referred to as a 3D camera or depth camera. Examples of depth cameras include stereoscopic cameras, structured light cameras, and time-of-flight (TOF) cameras. Other 3D imaging technology may also be used. In general, a stereoscopic camera performs stereo imaging in which 2D images from two (or more) passive image sensors are used to determine a depth image from disparity measurements between the 2D images. In general, a structured light camera projects a known pattern of light onto a scene and analyzes the deformation of the pattern from striking the surfaces of objects in the scene to determine the depth. In general, a TOF camera emits light pulses into the scene and measures the time between an emitted light pulse and the corresponding incoming light pulse to determine scene depth. Depth cameras such as structured light camera and TOF cameras may also incorporate additional imaging sensors to generate a 2D grayscale or color image of the scene in addition to the depth image.

The surveillance cameras 202, 204, 208 may be stationary, may pan a surveilled area, or a combination thereof. The surveillance cameras may include functionality for encoding and transmitting video sequences to a monitoring system 210, 212 or may be connected to a system (not specifically shown) that provides the encoding and/or transmission. Although not specifically shown, one or more of the surveillance cameras 202, 204, 206 may be directly connected to a monitoring system 210, 212 via a wired interface instead of via the network 208.

Different monitoring systems 210, 212 are shown to provide examples of the types of systems that may be connected to surveillance cameras. One or ordinary skill in the art will know that the surveillance cameras in a network do not necessarily communicate with all monitoring systems in the network. Rather, each surveillance camera will likely be communicatively coupled with a specific computer 210 or surveillance center 212.

In one or more embodiments, the surveillance network 200 includes functionality define and monitor 3D video tripwires. Definition and monitoring of 3D video tripwires are described in reference to FIGS. 5 and 6. Monitoring of 3D video tripwires for object crossings may be performed in a suitably configured surveillance camera, or in a suitably configured computer in the surveillance center 212 that is receiving encoded video sequence from a surveillance camera, or in a computer 210. The definition of 3D video tripwires may be performed by a user via a user interface operating on a suitably configured computer in the surveillance center 212 or on the computer 210. An example of such a user interface is described in more detail in reference to FIG. 4.

The surveillance center 212 includes one or more computer systems and other equipment for receiving and displaying the video sequences captured by the surveillance cameras communicatively coupled to the surveillance center 212. The computer systems may be monitored by security personnel and at least one of the computer systems may be configured to generate audible and/or visual alarms in response to specified events detected through analysis of the images in the video sequences. In some embodiments, a computer system receiving a video sequence from a stationary surveillance camera may be configured to respond to alarms by calling security personnel, sending a text message or the like, or otherwise transmitting an indication of the alarm to security personnel.

The computer 210 is configured to receive video sequence(s) from one or more video surveillance cameras. Such a combination of a computer and one or more video surveillance cameras may be used, for example, in a home security system, a security system for a small business, etc. Similar to computers in a surveillance center, the computer 210 may be configured to generate audible and/or visual alarms in response to the detection of specified events and/or notify a security monitoring service or the home/business owner via a text message, a phone call, or the like when an alarm is signaled.

Figure 3:
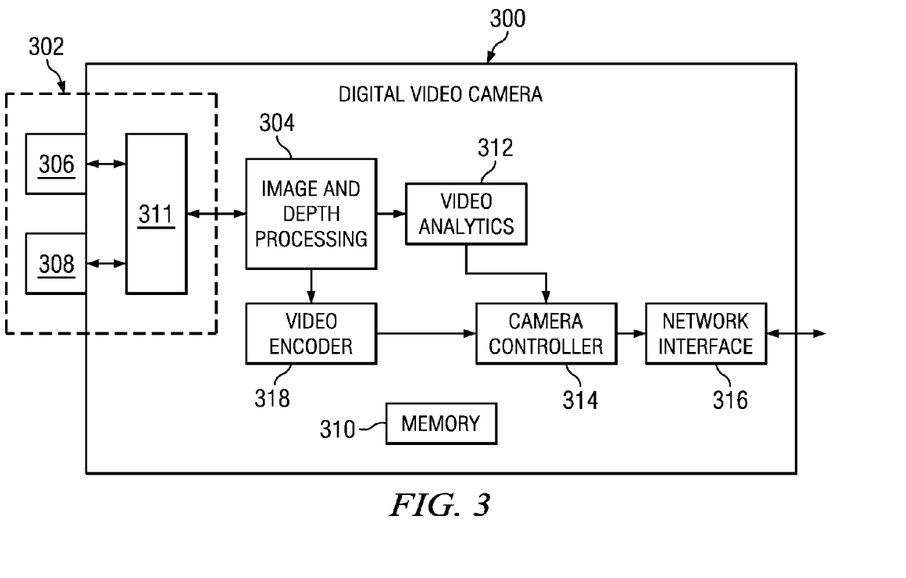
FIG. 3 is a block diagram of a 3D digital video camera.

FIG. 3 is a block diagram of an example digital video depth camera 300 that may be used for surveillance, e.g., in the surveillance network of FIG. 2. The depth camera 300 includes a 3D imaging system 302, an image and depth processing component 304, a video encoder component 318, a memory component 310, a video analytics component 312, a camera controller 314, and a network interface 316. The components of the depth camera 300 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory in the memory component 310 and executed by one or more processors.

The 3D imaging system 302 includes two imaging components 306, 308 and a controller component 311 for capturing the data needed to generate a depth image. The imaging components 306, 308 and the functionality of the controller component 311 vary depending on the 3D imaging technology implemented. For example, for a stereoscopic camera, the imaging components 306, 308 are imaging sensor systems arranged to capture image signals of a scene from a left viewpoint and a right viewpoint. That is, one imaging sensor system 306 is arranged to capture an image signal from the left viewpoint, i.e., a left analog image signal, and the other imaging sensor system 308 is arranged to capture an image signal from the right view point, i.e., a right analog image signal. Each of the imaging sensor subsystems 306, 308 includes a lens assembly, a lens actuator, an aperture, and an imaging sensor. The 3D imaging system 302 also includes circuitry for controlling various aspects of the operation of the system, such as, for example, aperture opening amount, exposure time, etc. The controller module 311 includes functionality to convey control information from the camera controller 314 to the imaging sensor systems 306, 308, to convert the left and right analog image signals to left and right digital image signals, and to provide the left and right digital image signals to the image and depth processing component 304.

For a TOF camera or a structured light camera, the imaging component 306 is an imaging sensor system arranged to capture image signals of a scene as previously described and the imaging component 308 is an illumination unit arranged to project light, e.g., infrared light, into the scene. The imaging sensor system 306 may also include an optical filter that matches the optical frequency of the light projected by the illumination unit 308. The 3D imaging system 302 also includes circuitry for controlling various aspects of the operation of the system, such as, for example, aperture opening amount, exposure time, synchronization of the imaging sensor system 306 and the illumination unit 308, etc. In a TOF camera, each pixel captured by the imaging sensor system 306 measures the time the light from the illumination unit 308 to surfaces in the scene and back. In a structured light camera, the pixels captured by the imaging sensor system 306 capture the deformation on surfaces in the scene of a pattern of light projected by the illumination unit 308. The controller module 311 includes functionality to convey control information from the camera controller 314 to the imaging sensor system 306 and the illumination unit 308, to convert the image signals from the imaging sensor system 306 to digital image signals, and to provide the digital image signals to the image and depth processing component 304.

The image and depth processing component 304 divides the incoming digital signal(s) into frames of pixels and processes each frame to enhance the image data in the frame. The processing performed may include one or more image enhancement techniques according to imaging technology used to capture the pixel data. For example, for stereoscopic imaging, the image and depth processing component 304 may perform one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment on each of the left and right images. The same enhancement techniques may also be applied to the images captured by a structured light camera. Enhancement techniques for images captured by a TOF camera may include faulty pixel correction and denoising.

The image and depth processing component 304 then uses the enhanced image data to generate a depth image. Any suitable algorithm may be used to generate the depth image from the enhanced image data. The depth images are provided to the video encoder component 308 and the video analytics component 312. If the camera 300 is a stereoscopic camera, the left and right 2D images are also provided to the video analytics component 312 and the video encoder component 308. If a structured light or TOF camera includes a human-viewable imaging sensor, the 2D image from that sensor is also provided to the video analytics component 312 and the video encoder component 308.

The video encoder component 308 encodes the images in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc.

The memory component 310 may be on-chip memory, external memory, or a combination thereof. Any suitable memory design may be used. For example, the memory component 310 may include static random access memory (SRAM), dynamic random access memory (DRAM), synchronous DRAM (SDRAM), read-only memory (ROM), flash memory, a combination thereof, or the like. Various components in the digital video camera 300 may store information in memory in the memory component 310 as a video stream is processed. For example, the video encoder component 308 may store reference data in a memory of the memory component 310 for use in encoding frames in the video stream. Further, the memory component 310 may store any software instructions that are executed by one or more processors (not shown) to perform some or all of the described functionality of the various components.

Some or all of the software instructions may be initially stored in a computer-readable medium such as a compact disc (CD), a diskette, a tape, a file, memory, or any other computer readable storage device and loaded and stored on the digital video camera 300. In some cases, the software instructions may also be sold in a computer program product, which includes the computer-readable medium and packaging materials for the computer-readable medium. In some cases, the software instructions may be distributed to the digital video camera 300 via removable computer readable media (e.g., floppy disk, optical disk, flash memory, USB key), via a transmission path from computer readable media on another computer system (e.g., a server), etc.

The camera controller component 314 controls the overall functioning of the digital video camera 300. For example, the camera controller component 314 may adjust the focus and/or exposure of the 3D imaging system 302 based on the focus quality and scene brightness, respectively, determined by the image and depth processing component 304. The camera controller component 314 also controls the transmission of the encoded video stream via the network interface component 316 and may control reception and response to camera control information received via the network interface component 316. Further, the camera controller component 314 controls the transfer of alarms and other information from the video analytics component 312 via the network interface component 316.

The network interface component 316 allows the digital video camera 300 to communicate with a monitoring system. The network interface component 316 may provide an interface for a wired connection, e.g., an Ethernet cable or the like, and/or for a wireless connection. The network interface component 316 may use any suitable network protocol(s).

The video analytics component 312 analyzes the content of images in the captured video stream to detect and determine temporal events not based on a single image. The analysis capabilities of the video analytics component 312 may vary in embodiments depending on such factors as the processing capability of the digital video camera 300, the particular application for which the digital video camera is being used, etc. For example, the analysis capabilities may range from video motion detection in which motion is detected with respect to a fixed background model to people counting, vehicle license plate recognition, object tracking, facial recognition, automatically analyzing and tagging suspicious objects in a scene, activating alarms or taking other actions to alert security personnel, etc. As part of the analysis of the content of images, the video analytics component 312 monitors user-specified 3D video tripwires as described herein.

Figure 4:
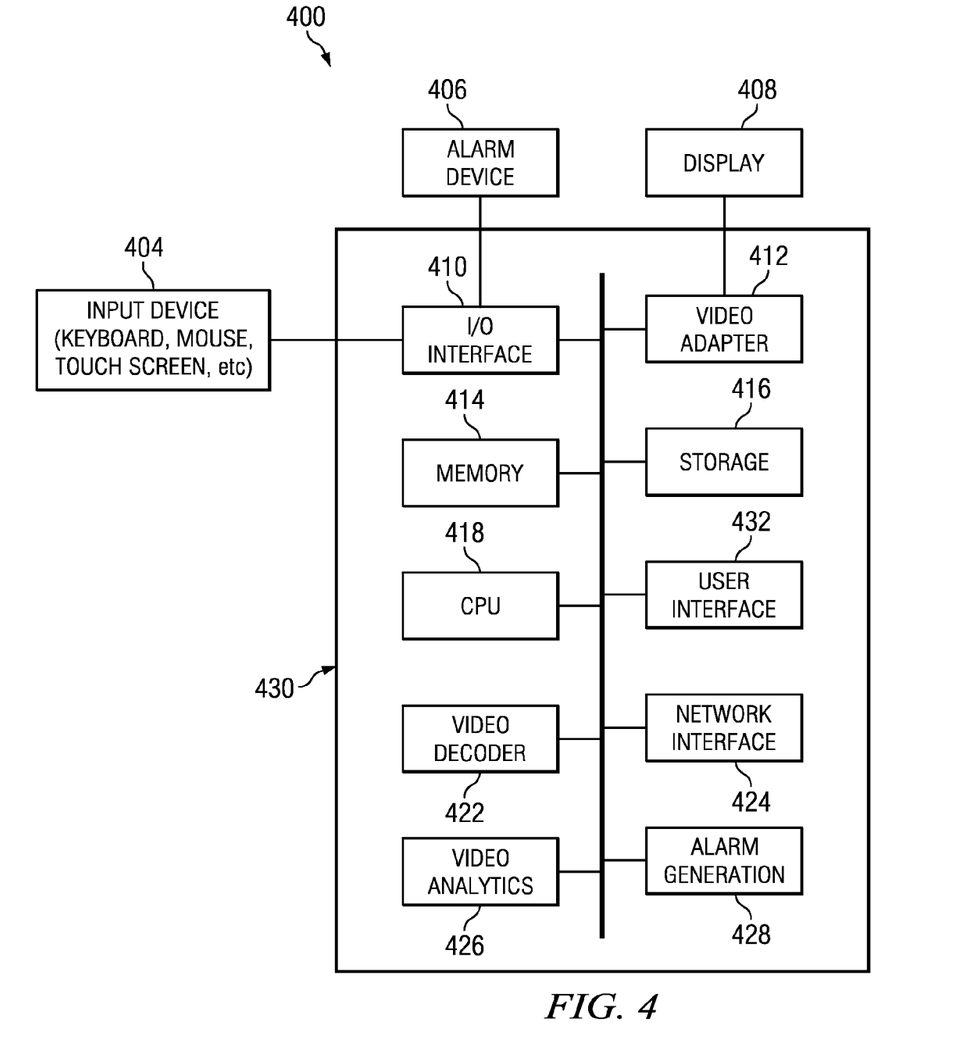
FIG. 4 is a block diagram of a computer.

FIG. 4 is a block diagram of a computer system 400 in accordance with one or more embodiments. The computer system 400 may be used in a surveillance network as, for example, the computer system 210 or as a computer system in the surveillance center 212. The computer system 400 includes a processing unit 430 equipped with one or more input devices 404 (e.g., a mouse, a keyboard, or the like), and one or more output devices, such as a display 408, or the like. In some embodiments, the computer system 400 also includes an alarm device 406. In some embodiments, the display 408 may be touch screen, thus allowing the display 408 to also function as an input device. The processing unit 430 may be, for example, a desktop computer, a workstation, a laptop computer, a dedicated unit customized for a particular application, or the like. The display may be any suitable visual display unit such as, for example, a computer monitor, an LED, LCD, or plasma display, a television, a high definition television, or a combination thereof.

The processing unit 430 includes a central processing unit (CPU) 418, memory 414, a storage device 416, a video adapter 412, an I/O interface 410, a video decoder 422, and a network interface 424 connected to a bus. In some embodiments, the processing unit 430 may include one or more of a video analytics component 426 and an alarm generation component 428 connected to the bus. The bus may be one or more of any type of several bus architectures including a memory bus or memory controller, a peripheral bus, video bus, or the like.

The CPU 418 may be any type of electronic data processor. For example, the CPU 418 may be a processor from Intel Corp., a processor from Advanced Micro Devices, Inc., a Reduced Instruction Set Computer (RISC), an Application-Specific Integrated Circuit (ASIC), or the like. The memory 414 may be any type of system memory such as static random access memory (SRAM), dynamic random access memory (DRAM), synchronous DRAM (SDRAM), read-only memory (ROM), flash memory, a combination thereof, or the like. Further, the memory 414 may include ROM for use at boot-up, and DRAM for data storage for use while executing programs.

The storage device 416 (e.g., a computer readable medium) may comprise any type of storage device configured to store data, programs, and other information and to make the data, programs, and other information accessible via the bus. In one or more embodiments, the storage device 416 stores software instructions that, when executed by the CPU 418, cause the processing unit 430 to monitor one or more digital video cameras being used for surveillance. The storage device 416 may be, for example, one or more of a hard disk drive, a magnetic disk drive, an optical disk drive, or the like.

The software instructions may be initially stored in a computer-readable medium such as a compact disc (CD), a diskette, a tape, a file, memory, or any other computer readable storage device and loaded and executed by the CPU 418. In some cases, the software instructions may also be sold in a computer program product, which includes the computer-readable medium and packaging materials for the computer-readable medium. In some cases, the software instructions may be distributed to the computer system 400 via removable computer readable media (e.g., floppy disk, optical disk, flash memory, USB key), via a transmission path from computer readable media on another computer system (e.g., a server), etc.

The video adapter 412 and the I/O interface 410 provide interfaces to couple external input and output devices to the processing unit 430. As illustrated in FIG. 4, examples of input and output devices include the display 408 coupled to the video adapter 412 and the mouse/keyboard 404 and the alarm device 406 coupled to the I/O interface 410.

The network interface 424 allows the processing unit 430 to communicate with remote units via a network (not shown). In one or more embodiments, the network interface 424 allows the computer system 400 to communicate via a network to one or more digital video cameras to receive encoded video sequences and other information transmitted by the digital video camera(s). The network interface 424 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

The computer system 410 may also include other components not specifically shown. For example, the computer system 410 may include power supplies, cables, a motherboard, removable storage media, cases, and the like.

The video decoder component 422 decodes frames in an encoded video sequence received from a digital video camera in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc. The decoded frames may be provided to the video adapter 412 for display on the display 408. In embodiments including the video analytics component 426, the video decoder component 422 also provides the decoded frames to this component.

The video analytics component 426 analyzes the content of frames of the decoded video stream to detect and determine temporal events not based on a single frame. The analysis capabilities of the video analytics component 426 may vary in embodiments depending on such factors as the processing capability of the processing unit 430, the processing capability of digital video cameras transmitting encoded video sequences to the computer system 400, the particular application for which the digital video cameras are being used, etc. For example, the analysis capabilities may range from video motion detection in which motion is detected with respect to a fixed background model to people counting, vehicle license plate recognition, object tracking, facial recognition, automatically analyzing and tagging suspicious objects in a scene, activating alarms or taking other actions to alert security personnel, etc. As part of the analysis of the content of images, the video analytics component 426 may monitor user-specified 3D video tripwires as described herein.

The alarm generation component 428 may receive alarm data from a video camera via the network interface 424 and/or the video analytics component 426 and performs actions to notify monitoring personnel of the alarms. For example, if the digital video camera monitors a 3D video tripwire as described herein, the camera may transmit alarm data to the computer system 400 indicating that an object crossed the 3D video tripwire, e.g., may signal a tripwire crossing event in response to triggering of a rule defining the 3D video tripwire. The actions to be taken may be user-configurable and may differ according to the type of the alarm signal. For example, the alarm generation component 428 may cause a visual cue to be displayed on the display 408 for less critical alarms and may generate an audio and/or visual alarm via the alarm device 406 for more critical alarms. The alarm generation component 428 may also cause notifications of alarms to be sent to monitoring personnel via email, a text message, a phone call, etc.

A user interface 432 may be implemented on the computer system 400 to enable a user to define and remove 3D video tripwires in scenes under surveillance. More specifically, the user interface 432 facilitates the creation of 3D rules that specify a 3D video tripwire. In video surveillance systems, the term "rule" denotes a user-defined condition and a set of actions that are executed when the condition is met. A video analytics component analyzes the video to determine if/when the conditions are met and triggers appropriate actions.

When a user wishes to specify a 3D video tripwire for a scene under surveillance, an image or video of the scene as captured by a depth camera monitoring the scene is displayed. If the depth camera provides human-viewable color or grayscale 2D images, those images are displayed. For example, if the depth camera is a stereoscopic camera, images from the left or right video stream may be used. If such 2D images are not available, the depth images are displayed. In another example, some depth cameras such as TOF and structured light cameras may be equipped with a 2D imaging sensor for capturing color or grayscale images in addition to depth images.

The user may then select points in the scene corresponding to the desired location of the line or plane of the 3D video tripwire. When the user selects a point on the display, the x, y, z coordinates of the pixel corresponding to the point are determined from the depth image. Feedback is then provided to the user via an overlay that visually indicates the depth of other pixels in the scene relative to the point selected by the user. For example, a color or grayscale shading overlay may be used to reflect the depths of other pixels in the scene relative to the selected pixel such that pixels of approximately the same depth, i.e., of similar depth, are the same shade. In this way, the user can see if the line through a second point will be at the same depth or will be skewed so that the line is going deeper into the scene or coming out of the scene. The depths of other pixels relative to the selected pixel may be determined from the pixel values in the depth image. For example, to generate the overlay, the depths of the other pixels may be computed relative to the depth of the selected pixel and the results are used to shade the other pixels appropriately.

With the overlay, pixels at approximately the same depth, i.e., at a similar depth, as a selected pixel will be clearly visible to the user. This will assist the user in selecting other points to define the 3D line or plane. The user may also specify the actions to be executed when the specified 3D video tripwire is crossed. When the user indicates that the 3D tripwire definition is complete, the x, y, and z coordinates of the points, i.e., pixels, selected by the user are used to create a suitable 3D representation of the line or plane defined by the points. This representation is then appropriately communicated to the video analytics component that will monitor the 3D video tripwire, e.g., the video analytics component in the depth camera monitoring the scene or the video analytics component in a computer system receiving images from the depth camera monitoring the scene.

The user interface 432 may permit the creation of multiple 3D lines or planes in a scene that are either independent of each other, or together form a 3D volume such as a cube. A rule that specifies a 3D volume may be much more effective to secure the perimeter of an area from intruders (for instance, a swimming pool from small children) than utilizing a 2D polygon specified on the image plane. Accordingly, a 3D video tripwire may be defined as a 3D volume.

A user may specify 3D video tripwires via the user interface 432 whether or not there is any activity in the scene. A 3D video tripwire can be defined through rigid anchor points in the scene (e.g., non-moving scene elements such as walls, sides of doorways, etc.), or through instantaneous 3D coordinates of objects in motion (e.g., points on people as they reach the desired distance from the camera), or a combination of the above. In some embodiments, a depth background model of the scene is maintained that records the deepest (farthest) depth observed at each background pixel and is updated as needed. The background depth model may be generated and updated using any suitable technique. The user interface 432 may be configured to use the z-coordinate (depth) of the corresponding pixel in the depth background model, or to use the z-coordinate of the pixel in the current image when the user selects a point in the scene.

Such a user interface is beneficial for at least two reasons. First, 3D depth can be simulated for the user via the overlay without requiring complex 3D graphics and visualization tools. Thus, the interface may be easily added to current user interfaces for operators of surveillance systems. Second, the user interface builds on user interactions and concepts used in current rule definition tools familiar to operators of surveillance systems. This may facilitate adoption by operators with little or no additional training.

Figure 5:
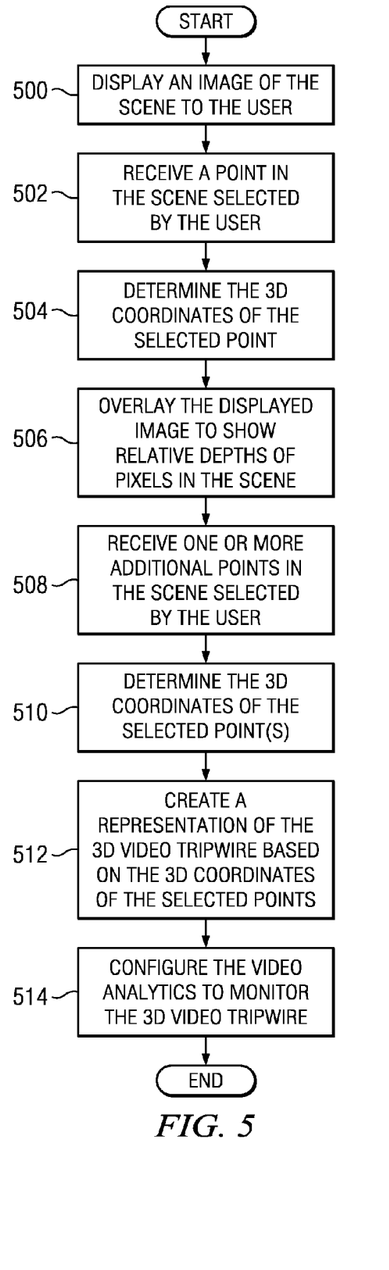
FIGS. 5 and 6 are flow diagrams of methods.

FIG. 5 is a flow diagram of a method for defining a 3D video tripwire in a scene monitored by a depth camera. Initially, images or video from the depth camera are displayed for a user 500. As previously described, the images displayed may be human-viewable 2D color or grayscale images, or may be depth images. The user then selects a point in the displayed scene as the starting point for a line in the scene and the 2D coordinates of the point are received 502. The 3D coordinates (x, y, z) of the pixel corresponding to the selected point are then determined 504. As previously described, the 3D coordinates may be determined, for example, from a current depth image of the scene or from a background depth model. An overlay is then placed over the displayed video images that visually indicates to the user the relative depths of pixels in the scene with respect to the selected point/pixel 506. As previously described, the overlay may use color or grayscale shading to represent the relative pixel depths.

The user may then select one or more additional points in the scene to define the desired 3D tripwire. The selected point(s) are received 508 and the 3D coordinates of pixels corresponding to the selected point(s) are determined 510. The 3D coordinates may be determined, for example, from a current depth image of the scene or from a background depth model. A suitable representation of the 3D video tripwire is then created based on the 3D coordinates of the selected points 512. The particular representation is implementation dependent. For example, a 3D video tripwire may be denoted by the selected points, in a point-slope form, or as sequence of points along a line. A video analytics component that is used to analyze the images captured by the depth camera is then configured to monitor the 3D video tripwire 514.

Figure 6:
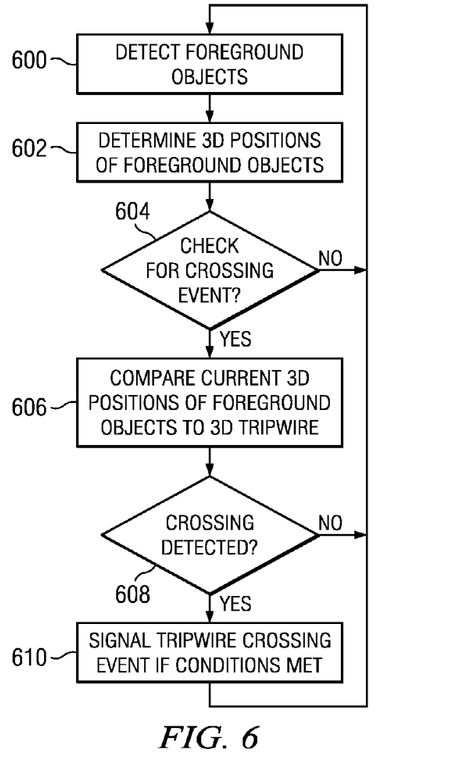

FIG. 6 is a flow diagram of a method for monitoring a 3D video tripwire. The method may be performed in a digital video depth camera and/or in a system receiving video sequences from a digital video depth camera. Initially, foreground objects are detected in the current depth image 600. Any suitable technique for detecting foreground objects may be used. In general, to detect foreground objects, background subtraction is performed between the depth image and a depth background model of the scene under observation to generate a binary mask image. Morphological operations such as dilation and erosion may then be performed on the binary image to eliminate isolated pixels and small regions. Connected components analysis is then perform to extract individual blobs, i.e., sets of foreground pixels connected in the binary image. Some suitable techniques for detecting foreground objects in a depth image are described in C. Eveland, et al., "Background Modeling for Segmentation of Video-Rate Stereo Sequences," IEEE Computer Vision and Pattern Recognition, pp. 266-271, June 1998; M. Harville, et al., "Foreground Segmentation Using Adaptive Mixture Models in Color and Depth," IEEE Workshop on Detection and Recognition of Events in Video, pp. 3-11, July 2001; and J. Salas and C. Tomasi, "People Detection Using Color and Depth Images," Mexican Conference on Pattern Recognition, pp. 127-135, June 2011.

The 3D positions of each of the detected foreground objects in the depth image are then determined 602. A 3D position of a foreground object may be determined, for example, from the 3D coordinates of the centroid of the foreground object. Each 3D position may be added to a history of 3D coordinates for the respective foreground object.

A determination is then made as to whether or not a check is to be made for a crossing event 604. A check for crossing events may be performed for each image analyzed or periodically. The time periods for periodically checking crossing events may be predetermined and/or may be user configurable. If the check for crossing events is not to be performed 604, processing continues with the next image 600.

If the check for crossing events is to be performed 604, the current and historic (if available) 3D positions of the foreground objects are compared to the 3D video tripwire. A crossing of the 3D video tripwire may be found by comparing the history of object 3D position coordinates against the 3D representation of the tripwire. If this comparison shows that, over the course of the previous t frames (t is the length of the available history), the object passed from one side of the tripwire to the other, a crossing of the tripwire is detected. The length of the analyzed history (t frames) is dependent on the application.

If a crossing is not detected 608, then processing continues with the next image 600. Otherwise, a tripwire crossing event may be signaled if the conditions associated with the crossing event are met 610. For example, if a condition of signaling a crossing event is based on the trajectory of a foreground object when the crossing occurred, the tripwire crossing event may be signaled when the crossing foreground object is moving according to the specified trajectory; otherwise, the crossing may be ignored. Processing then continues with the next image 600.

Other Embodiments

While the invention has been described with respect to a limited number of embodiments, those skilled in the art, having benefit of this disclosure, will appreciate that other embodiments can be devised which do not depart from the scope of the invention as disclosed herein. For example, some depth cameras, e.g., a stereoscopic camera, may not generate a depth image. In such cases, the depth values may be computed by the video analytics component using data captured by the depth camera, e.g., left and right 2D images.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of processing a digital video sequence, the method comprising:
   detecting a foreground object in an image captured by a depth camera;
   determining three-dimensional (3D) coordinates of the foreground object; and
   comparing the 3D coordinates to a 3D video tripwire to determine if the foreground object has crossed the 3D video tripwire, wherein the 3D video tripwire comprises a user interface and wherein the user interface is further configured to receive two-dimensional (2D) coordinates of a first point in the scene selected by the user; and determine 3D coordinates of a first pixel corresponding to the first point using depth information corresponding to the scene.

2. The method of claim 1, further comprising:
   adding the 3D coordinates to a history of three-dimensional (3D) coordinates of the foreground object; and
   wherein comparing the 3D coordinates further comprises comparing 3D coordinates in the history to the 3D video tripwire to determine if the foreground object has crossed the 3D video tripwire.

3. The method of claim 1, further comprising signaling a crossing event when the foreground object is determined to have crossed the 3D video tripwire.

4. The method of claim 1, wherein the comparing the 3D coordinates is performed periodically.

5. The method of claim 1, wherein the 3D video tripwire is defined using a user interface configured to:
   display images of a scene monitored by the depth camera on a display screen, wherein the images are captured by the depth camera; and
   define the 3D video tripwire based on 3D coordinates of pixels corresponding to points selected in the scene by a user.

6. The method of claim 5, wherein the depth information corresponding to the scene is comprised in one selected from a group consisting of a depth image and a depth background model.

7. The method of claim 5, wherein the user interface is further configured to display an overlay on the displayed images, wherein the overlay visually indicates depths of pixels in the scene relative to a depth of the first pixel corresponding to the first point.

8. The method of claim 7, wherein the overlay uses one of color shading or grayscale to indicate the depths of the pixels.

9. The method of claim 7, wherein the user interface is further configured to
   receive 2D coordinates of a second point in the scene selected by the user while viewing the overlaid displayed images; and
   determine 3D coordinates of a second pixel corresponding to the second point using depth information corresponding to the scene,
   wherein the 3D video tripwire is generated based on the 3D coordinates of the first pixel and the 3D coordinates of the second pixel.

10. A surveillance system comprising:
    a three-dimensional (3D) imaging system configured to capture depth images of a scene; and
    a video analytics component configured to
    detect a foreground object in an image captured by the 3D imaging system;
    determine 3D coordinates of the foreground object; and
    compare the 3D coordinates to a 3D video tripwire to determine if the foreground object has crossed the 3D video tripwire, wherein the 3D video tripwire comprises a user interface and wherein the user interface is further configured to receive two-dimensional (2D) coordinates of a first point in the scene selected by the user; and determine 3D coordinates of a first pixel corresponding to the first point using depth information corresponding to the scene.

* * * * *